US010959065B2

(12) United States Patent
Garcia Martin et al.

(10) Patent No.: US 10,959,065 B2
(45) Date of Patent: Mar. 23, 2021

(54) CHARGING FOR SERVICES IN TELECOMMUNICATIONS NETWORKS

(71) Applicant: Telefonaktiebolaget LM Ericsson (publ), Stockholm (SE)

(72) Inventors: Miguel Angel Garcia Martin, Madrid (ES); Pablo Martinez De La Cruz, Madrid (ES)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 106 days.

(21) Appl. No.: 16/066,455

(22) PCT Filed: Jan. 22, 2016

(86) PCT No.: PCT/EP2016/051383
§ 371 (c)(1),
(2) Date: Jun. 27, 2018

(87) PCT Pub. No.: WO2017/125168
PCT Pub. Date: Jul. 27, 2017

(65) Prior Publication Data
US 2019/0014454 A1   Jan. 10, 2019

(51) Int. Cl.
*H04W 4/24* (2018.01)
*H04M 15/00* (2006.01)
*H04L 12/14* (2006.01)
*H04L 29/08* (2006.01)
*H04L 12/725* (2013.01)

(52) U.S. Cl.
CPC .......... *H04W 4/24* (2013.01); *H04L 12/1407* (2013.01); *H04L 12/1425* (2013.01);
(Continued)

(58) Field of Classification Search
CPC .. H04W 4/24; H04L 12/1425; H04L 67/2833; H04L 12/1407; H04L 12/1467;
(Continued)

(56) References Cited

U.S. PATENT DOCUMENTS 9,848,090 B2 * 12/2017 Cai .................. H04M 15/65
9,853,898 B1 * 12/2017 Subramanian ........ H04L 45/745
2018/0227209 A1 * 8/2018 Lin .................. H04L 43/10

FOREIGN PATENT DOCUMENTS

EP       2945329 A1   11/2015
WO    2016001727 A1    1/2016

OTHER PUBLICATIONS

International Search Report and Written Opinion dated Sep. 29, 2016 for International Application No. PCT/EP2016/051383 filed on Jan. 22, 2016, consisting of 10-pages.
(Continued)

*Primary Examiner* — Julio R Perez
(74) *Attorney, Agent, or Firm* — Patent Portfolio Builders, PLLC

(57) ABSTRACT

Methods and apparatus for implementing a service function chain of a mobile telecommunications network. A method for implementing a charging function in a service function chain of a mobile telecommunications network in which the service function chain includes a plurality of service functions in which each service function is configured to apply one or more services associated with a user packet traversing the service function chain towards a destination, and is configured to provide charging data related to the service function. A receiver receives collective charging data provided by the plurality of service functions, the collective charging data includes charging data for a plurality of services associated with a user packet. A charging controller controls charging for the plurality of services associated with the user packet based on the collective charging data.

14 Claims, 9 Drawing Sheets

(52) U.S. Cl.
CPC ...... *H04L 12/1467* (2013.01); *H04L 67/2833* (2013.01); *H04M 15/61* (2013.01); *H04M 15/66* (2013.01); *H04L 45/306* (2013.01); *H04L 67/327* (2013.01)

(58) Field of Classification Search
CPC .... H04L 67/327; H04L 45/306; H04M 15/66; H04M 15/61
See application file for complete search history.

(56) References Cited

OTHER PUBLICATIONS

Quinn, P. et al. Cisco Systems, Inc., "Network Service Header"; Network Working Group Internet-Draft; Intended Status: Standards Track; ; Jan. 19, 2016, consisting of 44-pages.

Halpern, J. et al. Ericsson; "Service Function Chaining (SFC) Architecture"; Internet Engineering Task Force (IETF); ISSN: 2070-1721; Oct. 2015, consisting of 32-pages.

Quinn, P. et al. Cisco Systems, Inc., "Network Service Header (NSH)"; Internet Engineering Task Force (IETF); Category: Standards Track; ; Jan. 2018, consisting of 40-pages.

3GPP TS 32.240 V12.6.0; 3rd Generation Partnership Project; Technical Specification Group Services and System Aspects; Telecommunication management; Charging management; Charging architecture and principles (Release 12); Dec. 2014, consisting of 54-pages.

Office Action issued in corresponding EP Application No. 16701596.5 dated May 8, 2020, 05 Pages. All references cited therein have previously been made of record.

\* cited by examiner

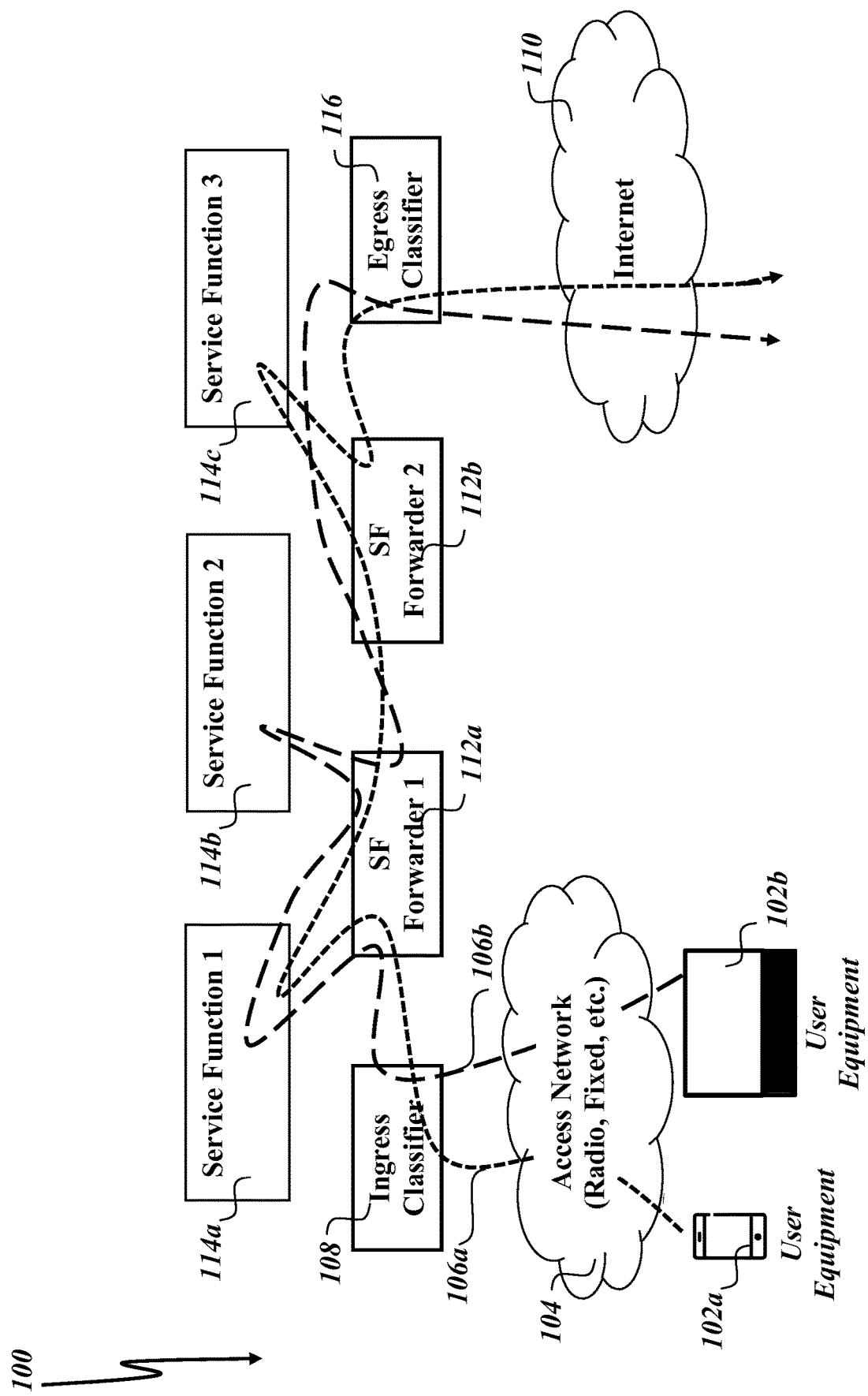
FIG. -1-

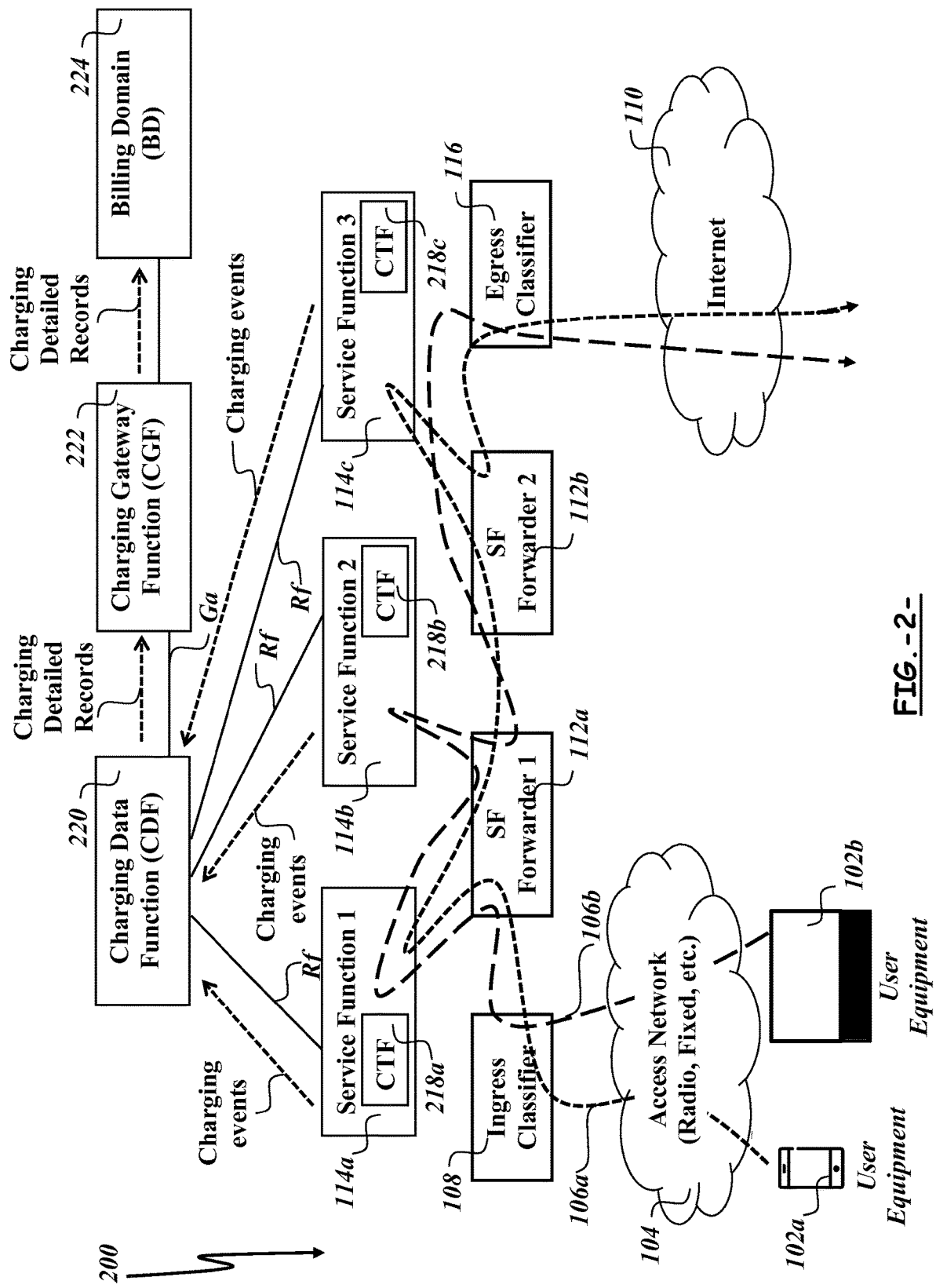
FIG. -2-

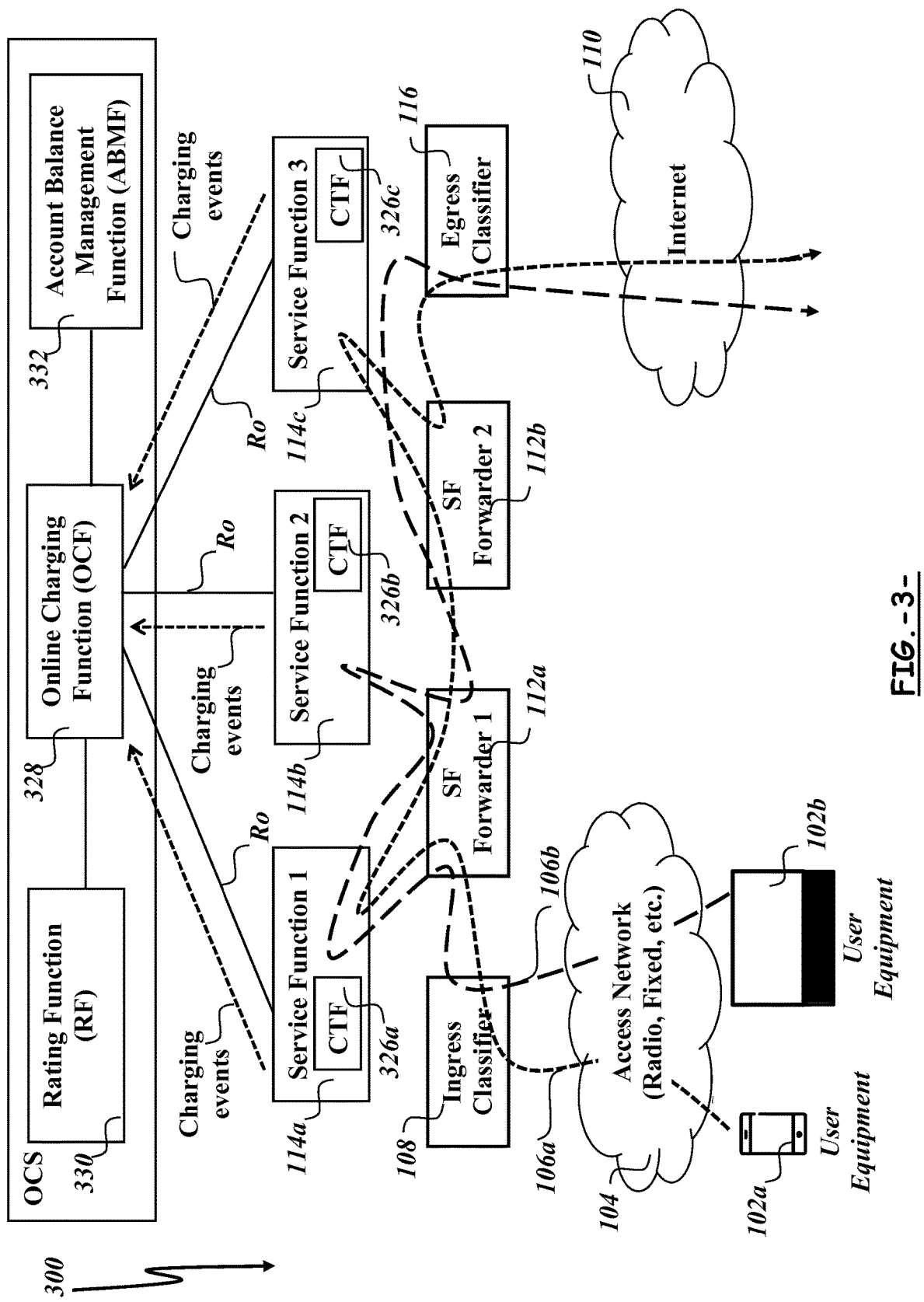
FIG. -3-

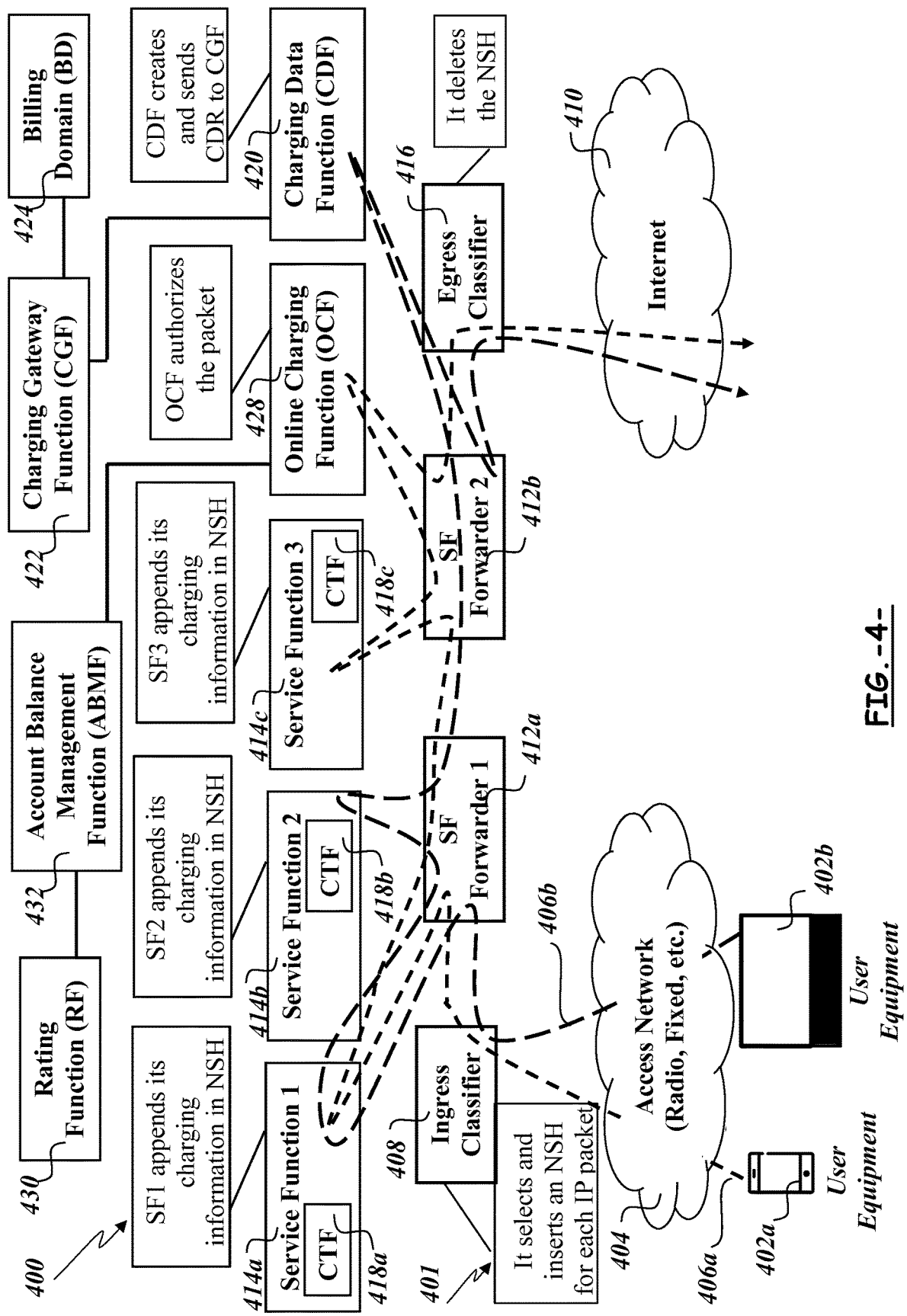
FIG. -4-

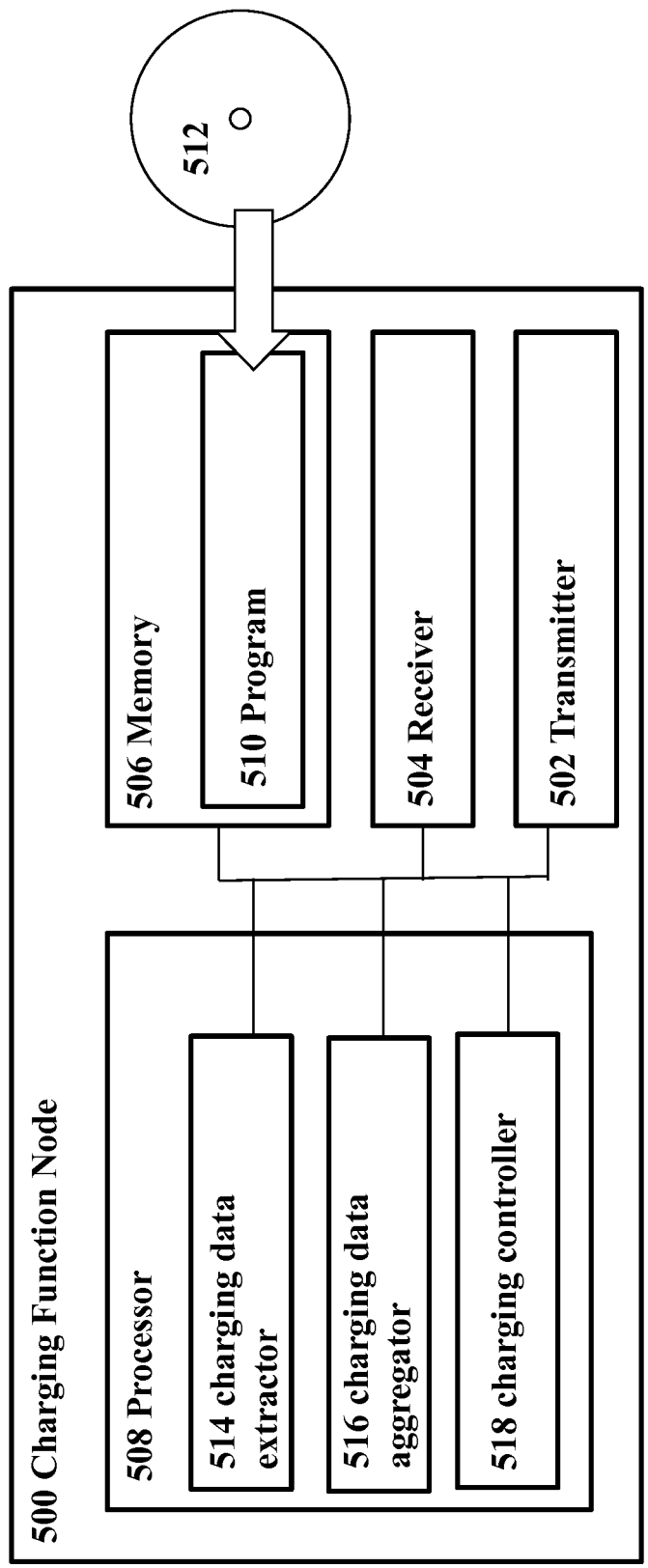
FIG. -5-

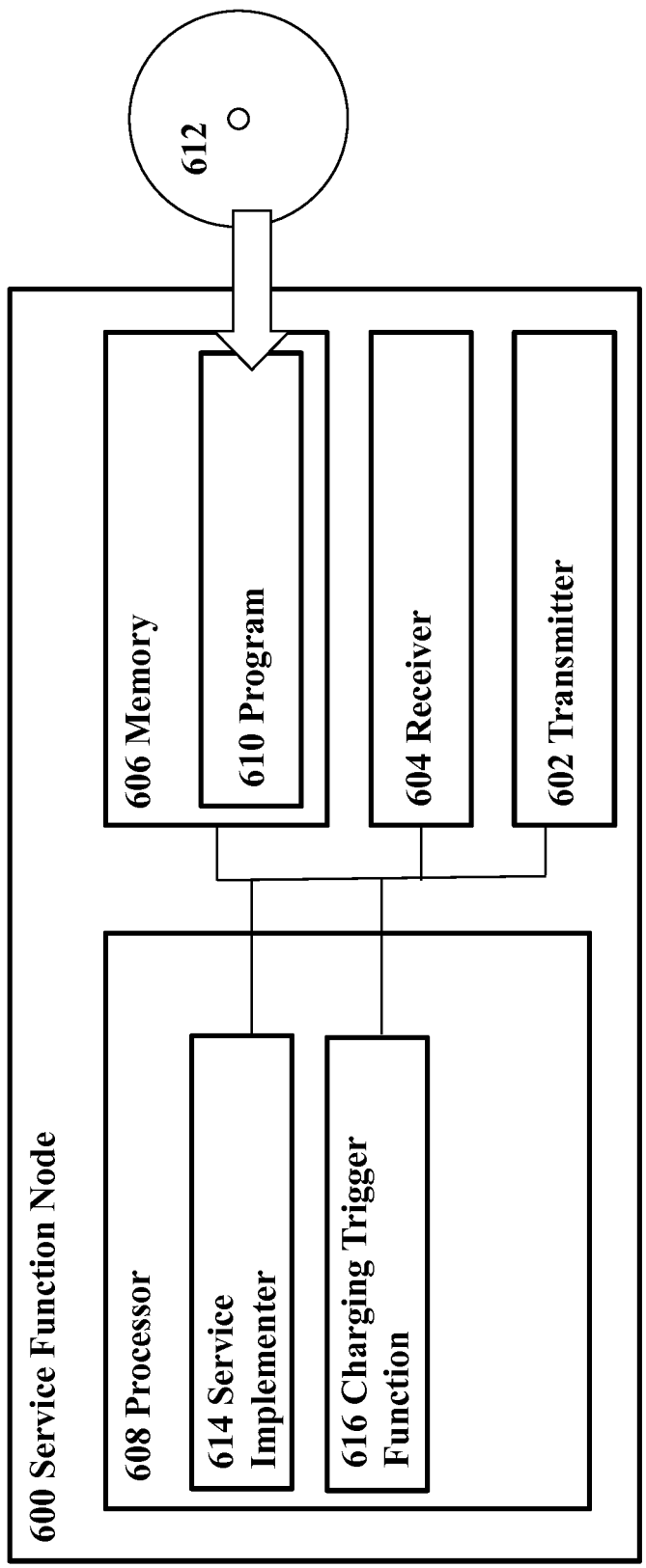
FIG. -6-

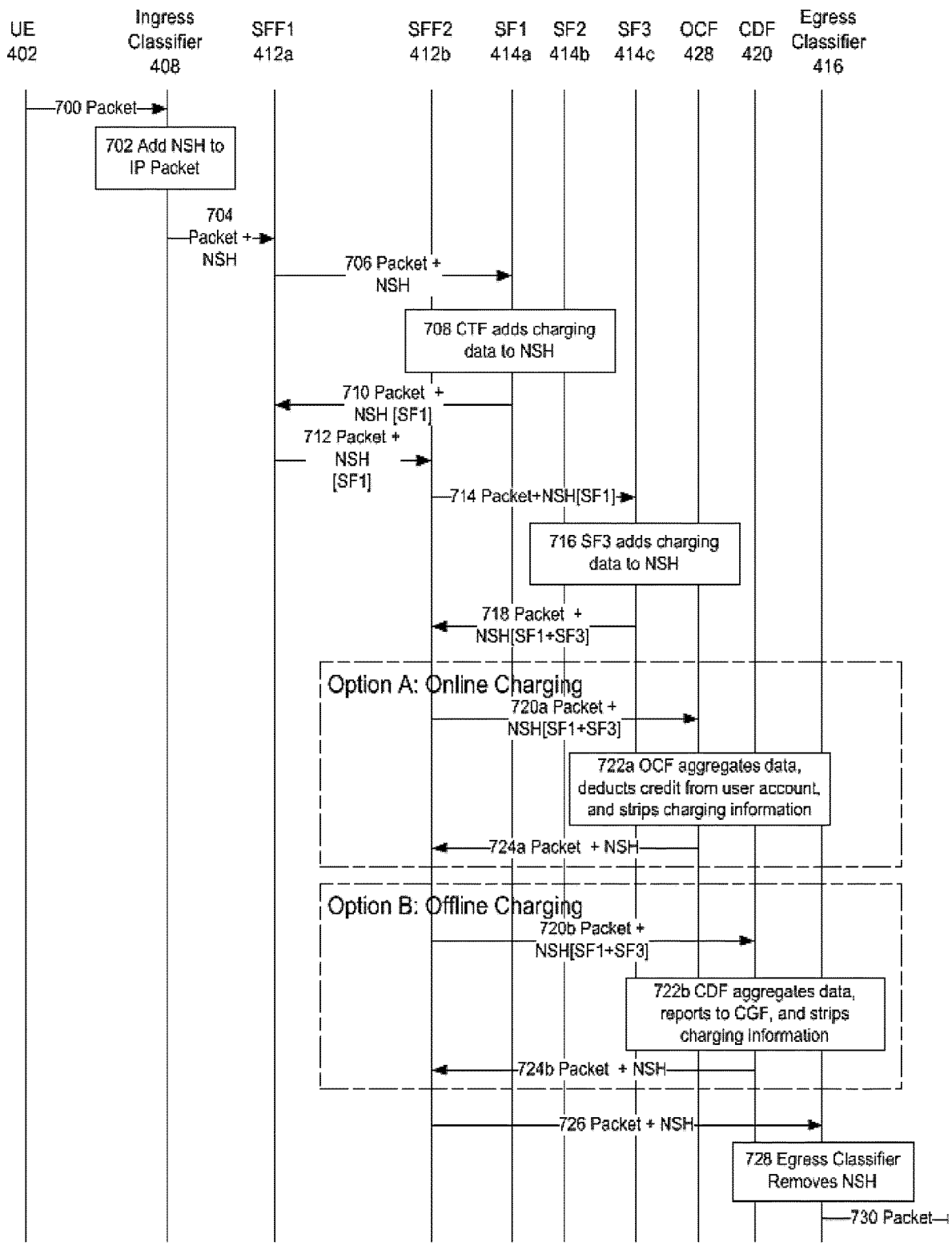
FIG.-7-

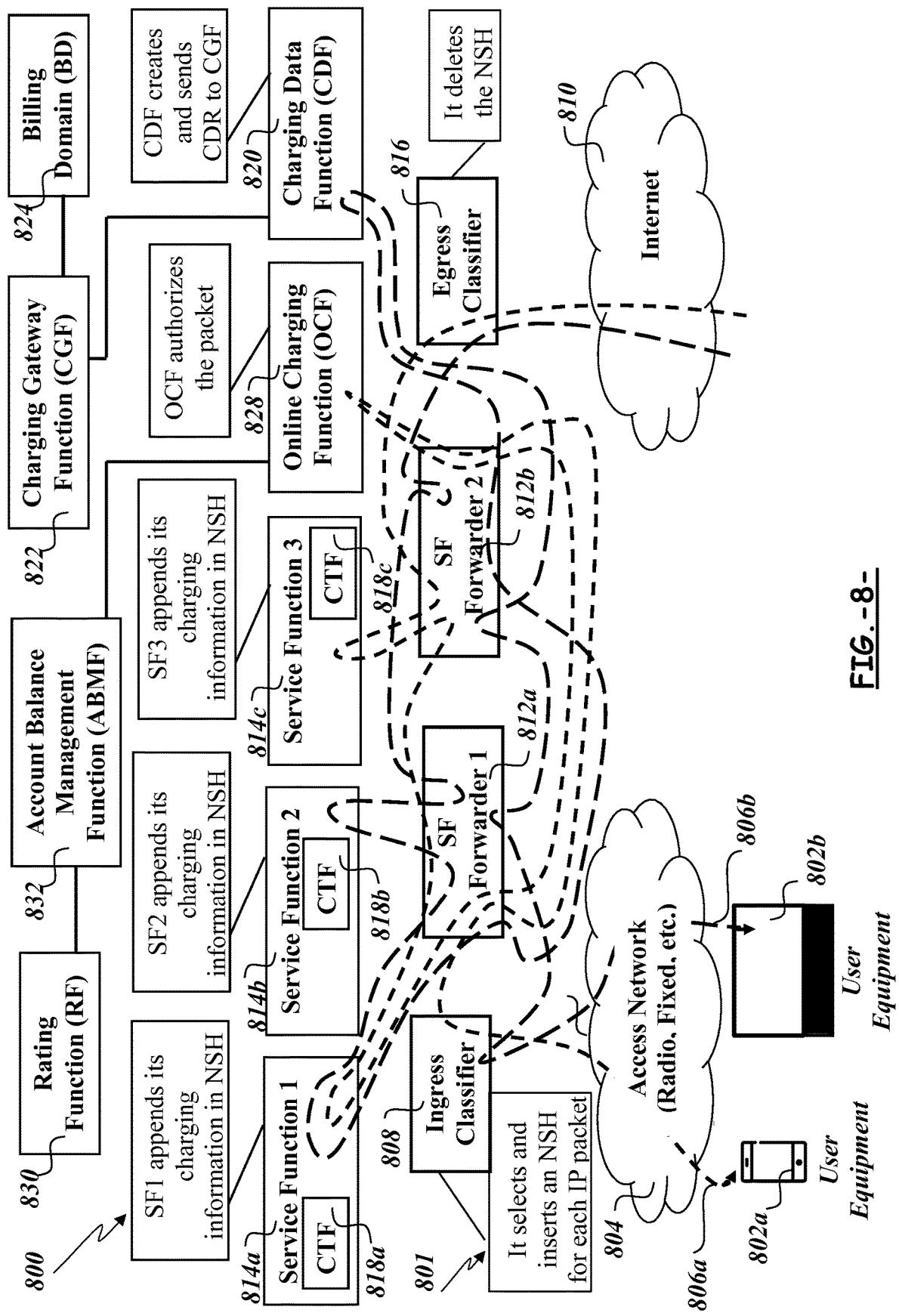
FIG. -8-

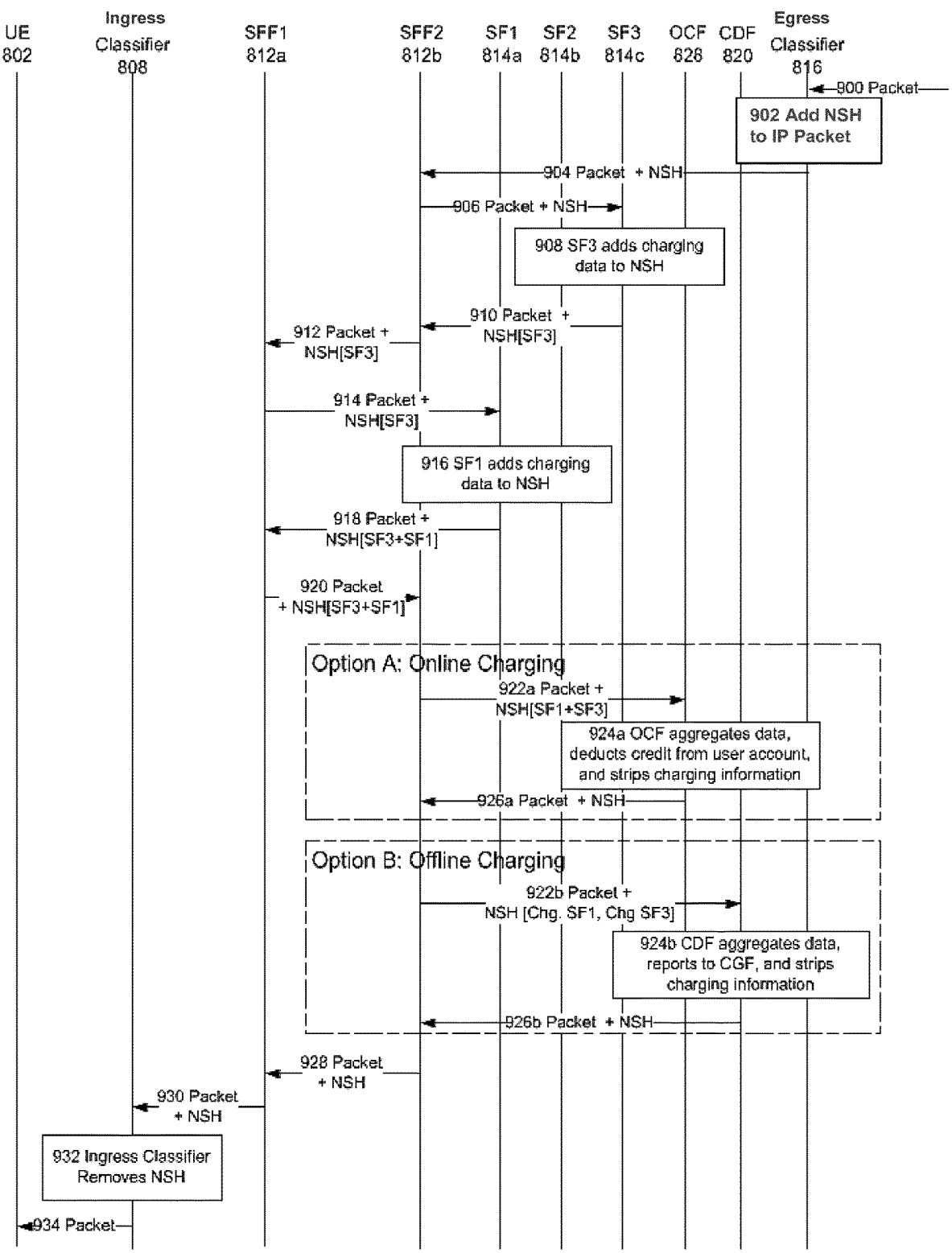
FIG.-9-

CHARGING FOR SERVICES IN TELECOMMUNICATIONS NETWORKS

CROSS-REFERENCE TO RELATED APPLICATIONS

This application is a Submission Under 35 U.S.C. § 371 for U.S. National Stage Patent Application of International Application Number: PCT/EP2016/051383, filed Jan. 22, 2016 entitled "CHARGING FOR SERVICES IN TELECOMMUNICATIONS NETWORKS," the entirety of which is incorporated herein by reference.

TECHNICAL FIELD

This invention relates to methods and apparatus for controlling the application of charging for services in a mobile telecommunications network. In particular, the invention may relate to, but need not be limited to, controlling the application of charging for services in a service function chain of a mobile telecommunications network

BACKGROUND

Service chaining is a technology that aims to simplify the management of Internet Protocol (IP) flow paths through a number of service functions, where each service function provides a service to either the network operator or the end user.

A service function chain comprises an ordered set of service functions. Ordering constraints are applied to packets and/or frames and/or flows as a result of user IP packet classification, in order to determine a flow path for a user IP packet through the service function chain. Therefore, a service function chain determines an abstracted view of the services that will be executed for a given flow. In order to provide a service, a service function may need to change or modify the IP stack layer 2 or layer 3 parameters of the IP packet data flow.

As shown in FIG. 1, in a service chain architecture 100 a User Equipment (UE) 102a-102b generates an IP packet in an uplink scenario that traverses one or more access networks 104, such as a Radio Access Network, fixed access network (Asymmetric Digital Subscriber Line (ADSL), Fiber) and/or a Packet Core network. User IP packets generated by the UE 102a-102b are transmitted through a service function chain, as shown by the arrows 106a-106b.

A user IP packet is transmitted to an ingress classifier 108 via the access network 104. The ingress classifier 108 analyses the IP stack layer 2 and layer 3 parameters and classifies the user IP packet according to pre-configured policy rules. The result of the classification process determines the service function path (i.e. the services and service functions that the user IP packet should traverse en-route to the Internet 110).

The ingress classifier 108 transmits the user IP packet to a first Service Function Forwarder (SFF) 112a, which is configured to transmit traffic to one or more service functions and, once services have been executed, to receive the traffic from the one or more service functions. There may be other SFFs 112b in the service function chain. The SFFs 112a-112b forward the user IP packet to one or more service functions 114a-114c dictated by the route determined at the ingress classifier 108. At each service function 114a-114c, once the service is executed, the IP data packet is returned to the originating SFF 112a-112b. The originating SFF 112a-112b may also forward the user IP packet to other SFFs 112a-112b located in service function chain and in the same or different administrative domains.

When an SFF 112a-112b determines that all of the service functions 114a-114c in the service function chain have been visited, the SFF 112a-112b forwards the user IP packet to an egress classifier 116, which forwards the user IP packet to the Internet 110.

Two technologies are widely used to route user IP packets in service chaining:

1) The ingress classifier 108 and the first SFF 112a-112b are integrated in the same node. Every user IP packet received at the first SFF/ingress classifier node from one of a user, a service function or from the Internet is evaluated and matched for a possible policy rule that determines the next hop for this packet. Effectively, a user IP packet is classified multiple times, every time it is received at the classifier/SFF node.

2) The ingress classifier 108 evaluates a user IP packet once, when it is received from the UE 102a-102b. The user IP packet is matched against the policy rules and a service function path 106a-106b is determined. The ingress classifier 108 then constructs a new user IP packet, by inserting a Network Service Header (NSH) into the user IP packet, and transmits the new user IP packet to the first SFF 112a in the determined service function chain for routing. The NSH comprises a path indicator indicating the service functions involved in the service function path 106a-106b. The first SFF 112a, based on the value of the NSH, determines what the next hop is for the user IP packet. Once an SFF 112a-112b determines that all of the service functions 114a-114c in the service function chain have been visited, the user IP packet is forwarded to an egress classifier 116, which removes the NSH and forwards the user IP packet towards its destination (e.g. the Internet).

Further, there are two types of charging architecture provided by 3GPP specifications: offline charging and online charging.

FIG. 2 shows an exemplary offline charging architecture 200, in which charging data associated with the use of services is collected concurrently with the use of the service. Specifically, a Charging Trigger Function (CTF) 218a-218c that forms part of each service function 114a-114c transmits charging data to a Charging Data Function (CDF) 220 after having provided the associated service at the service function 114a-114c. Once all services have been provided, the CDF 220 transmits the charging data to a Charging Gateway Function (CGF) 222, which then transmits the charging data on to a Billing Domain (BD) 224 for the purpose of subscriber billing and/or inter-operator accounting (or additional functions, e.g. statistics, at the operator's discretion). The BD typically comprises post-processing systems such as the operator's billing system or billing mediation device. The charging data may be generated by the network as Charging Detailed Records (CDR), which are then transferred to the network operator's Billing Domain (BD).

Each of the service functions 114a-114c that provide services to the user, implement and integrate a CTF 218a-218c (as defined in 3GPP TS 32.240) that is responsible for generating charging data and transmitting the charging data, over an Rf interface, towards the CDF 220.

The CDF 220 receives charging data from each CTF 218a-218c in the service chain, and constructs and sends CDRs, over a Ga interface, to the CGF 222, which in turn sends the CDRs to the BD 224. The BD 224 comprises all of the charging data associated with the services and needed for invoicing the user.

The transmissions over the Rf and Ga interfaces take place simultaneously with the user IP packet traversing the service chain. Therefore, there are no interruptions or delays in handling the IP packet to account for the offline charging architecture. However, the Rf interface, which runs between the CTF 218a-218c and the CDF 220, is configured to provide a large range of information to the CGF 222, including origin and destination IP addresses, types of events, user IDs, measurements. The use of the Rf interface for offline charging data means that it may be become clogged.

FIG. 3 shows an exemplary online charging architecture 300, in which charging data associated with the use of services is collected concurrently with the use of the service in a similar manner to offline charging. However, authorisation for the use of the service must be obtained by the network prior to the use of the service. This authorisation is obtained from an Online Charging System (OCS) upon request from the network.

When a service function 114a-114c receives a user IP packet, a Charging Trigger Function (CTF) 326a-326c implemented within the service function 114a-114c determines the relevant charging information and generates a charging data which is transmitted to an Online Charging Function (OCF) 328 of the Online Charging System (OCS) in real-time over an Ro or CAP interface. The OCS then returns an appropriate authorisation by interaction with a Rating Function 330 and an Account balance Management Function (ABMF) 332. The authorisation may be limited in its scope (e.g. volume of data or duration), therefore the authorisation may have to be renewed multiple times during the use of the services.

In the online charging architecture, the CTF within each service function 114a-114c needs to temporarily stop the user IP packet (i.e., temporarily not provide the service) until authorisation from the OCS is obtained. Therefore, charging data from the CTF 326a-326c to the OCS does not run concurrently with the user plane traffic. This can negatively affect, in real-time, the service rendered and therefore a direct interaction of the charging mechanism with the control of network resource usage is required. The negative effect includes, for example, delays in the start of the execution of a service, jitter, time and bandwidth constraints.

It should be noted that the charging data utilised in online charging is not necessarily identical to the charging data utilised in offline charging. Additionally, the behaviour of the CTF 326a-326c in an online charging system differs to the behaviour of the CTF 218a-218c in an offline charging architecture. In an online charging architecture the CTF 326a-326c temporarily stops the user traffic until authorisation to deliver the service is granted, whereas in an offline charging architecture the CTF 218a-218c merely informs the CDF 220 of the charging event without impacting the processing of the data traffic.

Several problems arise when the 3GPP charging architecture is applied to service chaining.

For example, the current offline charging approach for service chaining creates a scalability problem for the CDF 220 and the service functions 114a-114c, as well as the network elements that lie in between them (e.g., switches and routers). This is problematic when implementing offline charging capabilities for non-telco service functions.

Additionally, the scalability of the CDF 220 (in offline charging) and the OCF 328 (in online charging) may be compromised in large deployments, due to the multiple sessions that are established over the Rf interface (in offline charging) and the Ro/CAP interfaces (in online charging).

Further, in an online charging architecture, each service function 114a-114c in a chain temporarily delays the user plane traffic until authorisation from the OCS is granted. This produces a cumulative delay of the user plane traffic that may be noticeable to the user. This delay may be particularly noticeable in conversational communications (e.g., voice over IP).

Additionally, service functions 114a-114c are required to implement both online charging architecture and offline charging architecture, since the CTF 218a-218c and 326a-326c within the service function 114a-114c is implemented differently depending on which charging architecture is applied. For example, the service function 114a-114c inserts different charging data depending on which architecture is implemented. Additionally, the CTF 218a-218c and 326a-326c is configured to operate concurrently in an offline charging architecture, but temporarily retain the user plane traffic until authorisation has been granted from an OCS in an online charging architecture. The CTF 218a-218c and 326a-326c therefore may comprise two different pieces of software, of which, one is selected based on the charging architecture to be implemented, during configuration. This complicates the integration of charging capabilities into non-telco service functions.

SUMMARY

Methods and apparatus disclosed herein may relate to implementations in which the ingress classifier includes a NSH in the user IP packet for service chaining. In such implementations, the service functions are configured to preserve the NSH in outbound packets and modify a Service Path Index.

According to an aspect of the invention, there is provided a network node for implementing a charging function in a service function chain of a mobile telecommunications network, the service function chain comprising a plurality of service functions, each service function configured to apply one or more services associated with a user packet traversing the service function chain towards a destination, and configured to provide charging data related to the service function. The network node comprises a receiving means, which may be a receiver, configured to receive collective charging data provided by the plurality of service functions, the collective charging data comprising charging data for a plurality of services associated with a user packet. The network node comprises a charging controlling means, which may be a charging controller, configured to control charging for the plurality of services associated with the user packet based on the collective charging data.

Optionally, the receiver is configured to receive the user packet and a header, and wherein the collective charging data forms part of the header.

Optionally, the network node further comprises a charging data extracting means, which may be a charging data extractor configured to extract, from the collective charging data in the header, a plurality of individual charging data provided by the plurality of service functions, and a charging data aggregator configured to aggregate the extracted plurality of individual charging data into a charging record for use by the charging controller to control charging.

Optionally, the charging function is an Online Charging Function, OCF, and wherein the charging controller is further configured to control transmission of the user packet towards the destination based on the collective charging data.

Optionally, the network node further comprises a transmitting means, which may be a transmitter configured to transmit an authorisation request to one or more nodes of an online charging system, OCS, based on the charging record, wherein the receiver is configured to receive a response to the request, and wherein the charging controller is configured to permit transmission of the user packet towards the destination if the response indicates that the user is authorised to use the plurality of services.

Optionally, the charging function is a Charging Data Function, CDF, further comprising a transmitter configured to transmit the charging record towards a billing domain.

Optionally, the receiver is configured to receive the user packet and a Network Service Header, NSH, the NSH comprising the collective charging data and a path indicator, which indicates the service functions of the service function chain.

According to the invention in another aspect, there is provided a method for implementing a charging function in a service function chain of a mobile telecommunications network, the service function chain comprising a plurality of service functions, each service function configured to apply one or more services associated with a user packet traversing the service function chain towards a destination, and configured to provide charging data related to the service function. The method comprises receiving, by a receiver, collective charging data provided by the plurality of service functions, the collective charging data comprising charging data for a plurality of services associated with a user packet. The method comprises controlling, by a charging controller, charging for the plurality of services associated with the user packet based on the collective charging data.

Optionally, the receiver receives the user packet and a header, and wherein the collective charging data forms part of the header.

Optionally, the method further comprises extracting from the collective charging data in the header, by a charging data extractor, a plurality of individual charging data provided by the plurality of service functions, and aggregating, by a charging data aggregator, the extracted plurality of individual charging data into a charging record for use by the charging controller to control charging.

Optionally, the charging function is an Online Charging Function, OCF, and wherein the charging controller controls transmission of the user packet towards the destination based on the collective charging data.

Optionally, the method further comprises transmitting, by a transmitter, an authorisation request to one or more nodes of an online charging system, OCS, based on the charging record; receiving, by the receiver, a response to the request; and permitting, by the charging controller, transmission of the user packet towards the destination if the response indicates that the user is authorised to use the plurality of services.

Optionally, the charging function is a Charging Data Function, CDF, the method further comprising a transmitter transmitting the charging record towards a billing domain.

Optionally, the receiver is configured to receive the user packet and a Network Service Header, NSH, the NSH comprising the collective charging data and a path indicator, which indicates the service functions of the service function chain.

According to the invention in another aspect, there is provided a computer program comprising instructions which, when executed on at least one processor, cause the at least one processor to carry out the method described above.

According to the invention in another aspect, there is provided a carrier containing the computer program above, wherein the carrier is one of an electronic signal, optical signal, radio signal, or non-transitory computer readable storage medium.

According to the invention in another aspect, there is provided a network node for implementing a service function in a service function chain of a mobile telecommunications network, the service function chain comprising a plurality of service functions, each service function configured to apply one or more services associated with a user packet traversing the service function chain towards a destination, and configured to provide charging data related to the service function.

The network node comprises a receiving means, which may be a receiver configured to receive a user packet. The network node comprises a service implementing means, which may be a service implementer configured to apply a service associated with the user packet and the service function. The network node comprises a charging trigger function means, which may be a charging trigger function, CTF, configured to determine charging data for the applied service, the CTF being further configured to generate an updated user packet comprising the charging data. The network node comprises a transmitting means, which may be a transmitter configured to return the updated user packet.

Optionally, the received user packet is a previously updated user packet comprising previous charging data added by one or more previous service functions in the service function chain.

Optionally, the CTF is configured to determine same charging data for the applied service irrespective of whether the charging function is a Charging Data Function, CDF, or an Online Charging Function, OCF.

Optionally, the receiver is configured to receive the user packet and a Network Service Header, NSH, the NSH comprising a path indicator, which indicates the service functions of the service chain, and wherein the CTF is configured to add the determined charging data into the NSH.

According to the invention in another aspect, there is provided a method for implementing a service function in a service function chain of a mobile telecommunications network, the service function chain comprising a plurality of service functions, each service function configured to apply one or more services associated with a user packet traversing the service function chain towards a destination, and configured to provide charging data related to the service function. The method comprises receiving, by a receiver, a user packet. The method comprises applying, by a service implementer, a service associated with the user packet and the service function. The method comprises determining, by a charging trigger function, CTF, charging data for the applied service. The method comprises generating, by the CTF, an updated user packet comprising the determined charging data. The method comprises returning, by a transmitter, the updated user packet.

Optionally, the received user packet is a previously updated user packet comprising previous charging data added by one or more previous service functions in the service function chain.

Optionally, the CTF determines same charging data for the applied service irrespective of whether the charging function is a Charging Data Function, CDF, or an Online Charging Function, OCF.

Optionally, the receiver receives the user packet and a Network Service Header, NSH, the NSH comprising a path indicator, which indicates the service functions of the service chain, and wherein the CTF adds the determined charging data into the NSH.

According to the invention in another aspect, there is provided a computer program comprising instructions which, when executed on at least one processor, cause the at least one processor to carry out the method described above.

According to the invention in another aspect, there is provided a carrier containing the computer program above, wherein the carrier is one of an electronic signal, optical signal, radio signal, or non-transitory computer readable storage medium.

According to the invention in another aspect, there is provided a system for implementing a service function chain of a mobile telecommunications network. The system comprises a plurality of service functions arranged sequentially. Each service function comprises: a receiver configured to receive a user packet from a service function forwarder in the service function chain; a service implementer configured to apply a service associated with the user packet and the service function; a charging trigger function, CTF, configured to determine charging data for the applied service, the CTF being further configured to generate an updated user packet comprising the charging data; and a transmitter configured to return the updated user packet towards the service function forwarder in the service function chain. The system further comprises a charging function. The charging function comprises: a further receiver configured to receive, from the service function forwarder, collective charging data comprising individual charging data determined by each of the plurality of service functions; and a charging controller configured to control charging for the applied services based on the collective charging data.

Optionally, the receiver is configured to receive the user packet and a Network Service Header, NSH, the NSH comprising a path indicator, which indicates the service functions of the service chain; wherein the CTF is configured to add the determined charging data into the NSH, and wherein the further receiver is configured to receive the user packet and the NSH, the NSH comprising the collective charging data and the path indicator, which indicates the service functions of the service chain.

According to the invention in another aspect, there is provided a method for implementing a service function chain of a mobile telecommunications network. The method comprises: at a plurality of service functions arranged sequentially, receiving, by a receiver, a user packet from a service function forwarder in the service function chain; applying, by a service implementer, a service associated with the user packet and the service function; determining, by a charging trigger function, CTF, charging data for the applied service; generating, by the CTF, an updated user packet comprising the charging data; and returning, by a transmitter, the updated user packet towards the service function forwarder in the service function chain. The method further comprises, at a charging function, receiving, by a further receiver from the service function forwarder, collective charging data comprising individual charging data determined by each of the plurality of service functions; and controlling, by a charging controller, charging for the applied services based on the collective charging data.

Optionally, the receiver receives the user packet and a Network Service Header, NSH, the NSH comprising a path indicator, which indicates the service functions of the service chain; wherein the CTF adds the determined charging data into the NSH, and wherein the further receiver receives the user packet and the NSH, the NSH comprising the collective charging data and the path indicator, which indicates the service functions of the service chain.

According to the invention in another aspect, there is provided a computer program comprising instructions which, when executed on at least one processor, cause the at least one processor to carry out the method described above.

According to the invention in another aspect, there is provided a carrier containing the computer program above, wherein the carrier is one of an electronic signal, optical signal, radio signal, or non-transitory computer readable storage medium.

BRIEF DESCRIPTION OF THE DRAWINGS

FIG. 1 is an architecture diagram showing a service function chain;

FIG. 2 is an architecture diagram showing a service function chain;

FIG. 3 is an architecture diagram showing a service function chain;

FIG. 4 is an architecture diagram showing a service function chain;

FIG. 5 is a schematic diagram showing a charging function node;

FIG. 6 is a schematic diagram showing a service function node;

FIG. 7 is a signalling diagram showing a method for controlling the application of charging for services in a mobile telecommunications network;

FIG. 8 is an architecture diagram showing a service function chain; and

FIG. 9 is a signalling diagram showing a method for controlling the application of charging for services in a mobile telecommunications network.

DETAILED DESCRIPTION

Generally disclosed herein are methods and apparatus for controlling application of charging for services in a mobile telecommunications network, irrespective of the charging scheme. In particular, methods and apparatus disclosed include a CDF and/or an OCF as network elements, i.e. network nodes, in a service function chain and each CTF in each service function is configured to add charging data to a user IP packet passing through the chain, which results in collective charging data comprising individual charging data from each service function. When the collective charging data reaches the OCF in an online charging scenario, a single authorisation may be requested that covers all of the services applied in the service function chain. This can reduce the delay in waiting for authorisation and can reduce the amount of traffic on the Ro interface. In an offline charging scenario, collective charging data for all the services can be transmitted towards the BD once. This can reduce the amount of traffic on the Rf interface. In an embodiment, the plurality of individual charging data may be extracted from the collective charging data and aggregated into a single charging record transmitted towards the charging system.

In exemplary methods and apparatus, CTFs are configured to apply identical charging data to a user IP packet irrespective of whether an online or offline charging scheme is applied. The CTFs may be further configured to add charging data associated with a particular service applied at a service function such that the charging data for all services is collected in the service chain and received at a charging function. As used herein, the term "charging function" encompasses an OCF in an online charging scheme and a CDF in an offline charging scheme. In exemplary architectures the charging function may form part of the service chain.

It is the goal of this invention to produce a mechanism for integrating service chaining and the 3GPP charging architecture that mitigates or alleviates all the above mentioned problems.

Broadly, exemplary methods and apparatus disclosed herein comprise the following features:

When a service function receives a user IP packet, duly encapsulated with a header, such as an NSH, the service function applies the service associated with the user IP packet. The service function then generates an outbound user IP packet that includes an updated header. The updated header, in the case that it is a NSH, is generated according to the standard and therefore contains path label information indicating the service functions involved in the service function path, but in addition to the process required by the standard, the service function incorporates into the header charging data related to the applied service. A CTF generates the charging data and adds it to the header (e.g. NSH) prior to transmitting the outbound user IP packet to the next network element in the service function chain. The charging data may be encoded as metadata in a Context Header, which is part of the NSH.

As part of the configuration of service chains, a further service function may be added as a last service function (or alternatively, as a terminating source/sink function). The further service function may be the charging function commented above and may be one of:

An OCF for users where online charging is required;
A CDF for users where offline charging is required.

Both the OCF and the CDF may be considered regular service functions from the point of view of processing the path information included in the NSH.

Both the OCF and the CDF may treat the received collective charging data as they would normally do in known implementations if the charging data were received through the Ro and Rf, respectively.

If the OCF receives information from an ABMF and RF that the user does not have enough credit to enjoy the services applied in this flow of packets, the OCF generates a TCP reset back to the originator, in order to release resources and state of intermediate functions (routers, service functions, forwarders, etc.).

Exemplary methods and apparatus may have one or more of a number of benefits:

A simplified architecture with fewer interfaces from the service functions to the OCF and/or CDF.
  No need to configure routing from the service functions to the OCF and/or CDF.
  Lower dimensioning requirements for OCF and CDF in interfaces
  Lower number of simultaneous TCP connections required in OCF and CDF to receive charging information.

Simplified service functions
  Service functions need not be aware of whether online or offline charging is being applied.
  A simplified CTF in the service function may insert the same charging data to the header of a user IP packet irrespective of whether an online or offline charging scheme is being used.
  Service functions do not need to implement a feature to stop the user IP packet if the user does not have enough credit (this feature is moved to the OCF).
  Service functions need not be modified in order to implement both online and offline charging schemes. Moreover, service functions that are not charging-aware, such as most IT service functions, can be made charging-aware without modifications, by having the operating system networking infrastructure add the NSH Charging Trigger Function to the applicable flows.

Simplified network management
  The decision of applying online or offline charging to a user is controlled from a service chaining operation and management, which gives the operator the flexibility to change the type of charging with just one click.
  Redundancy and load balancing of the CDF and OCF is not specific to these functions, but generic to the concept of service chaining and service functions.

FIG. 4 shows an exemplary service chaining architecture 400 implemented within a mobile telecommunications network. The service chaining architecture 400 comprises a service function chain 401, a plurality of UEs 402a-402b, an OCS and an Offline Charging Architecture. The service chaining architecture 400 also comprises an access network 404 through which user IP packets are routed, as shown by arrows 406a-406b. The arrows 406a-406b show the route of user IP packets through the service chaining architecture 400 in an uplink scenario towards the Internet 410.

The service function chain 401 comprises an ingress classifier 408 that is in data communication with the access network 404 for receiving the user IP packets transmitted by the UEs 402a-402b. The ingress classifier 408 is configured to determine the route 406a-406b of the received user IP packets through the service function chain 401. To this end, the ingress classifier 408 may be configured to classify a user IP packet and insert a NSH with a path label to be further used for determining the routing to a next hop in any service function forwarder.

The service function chain 401 thus also comprises a plurality of service function forwarders 412a-412b, a plurality of service functions 414a-414c, one or more charging functions, which in exemplary embodiments may be a CDF 420 or an OCF 428, and an egress classifier 416. Each of the network elements of the service function chain 401 may be in data communication with another of the network elements of the service function chain 401. The charging functions 420, 428 may be considered service functions in exemplary methods and apparatus. Each of the charging functions 420, 428 is in data communication with a respective charging system. The CDF 420 is in data communication with a CGF 422, which in turn is in data communication with a BD 424. The OCF 428 is in data communication with an ABMF 432, which is in data communication with a RF 430.

It is noted that data communication encompasses any form of communication between network nodes that allows the flow of data therebetween. Data communications may be over a wired or wireless medium.

Each service function 414a-414c comprises a CTF 418a-418c. Each service function 414a-414c and its associated CTF 418a-418c are in data communication with each other.

In the exemplary architecture 400 of FIG. 4, the charging functions 420, 428 form part of the service function chain 401. That is, the charging functions 420, 428 receive the user IP packets and associated header in sequence, typically as a last service function of the service function chain 401. As a result, charging data can be added by each CTF 418a-418c such that it is collected in the header of the user IP packet and can be dealt with in a single action by the relevant charging function 420, 428.

FIG. 4 shows a route 406a using online charging and a route 406b using offline charging. If online charging is used, the last service function in the service function chain 401 is the OCF 428. If offline charging is used, the last service function in the service function chain 401 is the CDF 420. It should be understood that the primary difference between the online and offline routes in the exemplary architecture 400 of FIG. 4 is the charging function 420, 428 that is last in the service function chain 401.

In an embodiment where online charging is used, i.e. route 406a, the ingress classifier 408 forwards each user IP packet of the IP flow tagged with the same NSH, to the first service function forwarder 412a, which inspects the path label information included in the NSH and, according to the forwarding rules, forwards the user IP packet to the first service function 414a.

When the user IP packet is processed by the first service function 414a, the associated CTF 418a inserts its charging information inside the NSH. This charging information identifies the service function, the user that benefits from the service, the offered service characteristics, etc., for charging purposes, and does not depend on whether online or offline charging is going to be applied. The user IP packet is then forwarded back to first service function forwarder 412a. Therefore, user IP packets leaving the first service function 414a include an NSH header that contains both path label information (which was inserted by the Ingress classifier) and charging information inserted by the first service function 414a.

Then, the first service function forwarder 412a continues the processing by analyzing the NSH header and, according to the configured forwarding rules, forwards the user IP packet to a second service function forwarder 412b. This second service function forwarder analyzes the path information within the NSH header and, according to its forwarding rules, forwards the packets pertaining to this flow to a third service function 414c.

The third service function 414c does an analogous processing to the user IP packet as the first service function 414a did: it appends its own charging information to the NSH header and then forwards the user IP packet back to second service forwarder 412b. Therefore, user IP packets leaving the third service function 414c include an NSH header that contains path label information (which was inserted by the Ingress classifier), charging information inserted by the first service function 414a, and charging information inserted by the third service function 414c.

The second service function forwarder 412b receives user IP packets belonging to the route 406a and applies routing rules based on inspecting the path label information included in the NSH header. According to the preconfigured rules, the second service function forwarder 412b forwards the user IP packet now to the OCF service function 428, i.e. a charging function. The OCF service function 428 inspects the charging information inserted by the first service function 414a and the third service function 414c in the NSH header, and does the aggregation of the charging according to the charging rules. Furthermore, the OCF service function 428 also requires contacting the ABMF 432 and RF 430 functions in order to secure enough credit to provide this user with the two services provided by the first service function 414a and the third service function 414c, respectively.

In a first alternative, the OCF service function 428 may receive an indication from ABMF or RF that this user has enough credit to pay for both services, in which case the OCF service function 428 forwards the user IP packet back to the second service function forwarder 412b for further processing.

In a second alternative, the OCF service function 428 may receive an indication from ABMF or RF that this user does not have enough credit to pay for both services. The OCF service function 428 does not further process the user IP packet and instead generates backwards a TCP reset packet in order to tear down the TCP connection and release any resource in use by this flow in previous intermediate nodes.

If the user IP packet is successfully processed by the OCF service function, then it removes the charging information from the NSH, and forwards the user IP packet to the second service function forwarder 412b, from where it is further forwarded to the egress classifier 416. This node removes the whole NSH from the user IP packet and applies regular IP routing in order to forward the packet towards its final destination.

FIG. 5 shows a schematic representation of a network node for implementing a charging function 500, which may be either of the OCF service function 428 or the CDF service function 420 in the architecture 400 of FIG. 4. The charging function 500 comprises a transmitter 502 and a receiver 504. The transmitter 502 and receiver 504 may be in data communication with other network entities in a telecommunications network and are configured to transmit and receive data accordingly.

The charging function 500 further comprises a memory 506 and a processor 508. The memory 506 may comprise a non-volatile memory and/or a volatile memory. The memory 506 may have a computer program 510 stored therein. The computer program 510 may be configured to undertake the methods disclosed herein. The computer program 510 may be loaded in the memory 506 from a non-transitory computer readable medium 512, on which the computer program is stored. The processor 508 is configured to undertake one or more of the functions of a charging data extractor 514, a charging data aggregator 516 and a charging controller 518, as set out below.

Each of the transmitter 502 and receiver 504, memory 506, processor 508, charging data extractor 514, charging data aggregator 516 and charging controller 518 is in data communication with the other features 502, 504, 506, 508, 510, 514, 516, 518 of the charging function 500. The charging function 500 can be implemented as a combination of computer hardware and software. In particular, the charging data extractor 514, charging data aggregator 516 and charging controller 518 may be implemented as software configured to run on the processor 508. The memory 506 stores the various programs/executable files that are implemented by a processor 508, and also provides a storage unit for any required data. The programs/executable files stored in the memory 506, and implemented by the processor 508, can include the charging data extractor 514, charging data aggregator 516 and charging controller 518, but are not limited to such.

FIG. 6 shows a schematic representation of a network node for implementing a service function 600, which may be any of the service functions 414a-414c of FIG. 4. The service function 600 comprises a transmitter 602 and a receiver 604. The transmitter 602 and receiver 604 may be in data communication with other network entities in a telecommunications network and are configured to transmit and receive data accordingly.

The service function 600 further comprises a memory 606 and a processor 608. The memory 606 may comprise a non-volatile memory and/or a volatile memory. The memory 606 may have a computer program 610 stored therein. The computer program 610 may be configured to undertake the methods disclosed herein. The computer program 610 may be loaded in the memory 606 from a non-transitory computer readable medium 612, on which the computer program is stored. The processor 608 is configured to undertake one or more of the functions of a service implementer 614 and a CTF 616, as set out below.

Each of the transmitter 602 and receiver 604, memory 606, processor 608, service implementer 614 and CTF 616 is in data communication with the other features 602, 604, 606, 608, 610, 614, 616 of the service function 600. The service function 600 can be implemented as a combination of computer hardware and software. In particular, service implementer 614 and CTF 616 may be implemented as software configured to run on the processor 608. The memory 606 stores the various programs/executable files that are implemented by a processor 608, and also provides a storage unit for any required data. The programs/executable files stored in the memory 606, and implemented by the processor 608, can include the service implementer 614 and the CTF 616, but are not limited to such.

FIG. 7 shows a signalling diagram for the control and implementation of charging in a mobile telecommunications network comprising the architectures described herein. FIG. 7 relates to an uplink scenario.

The UE 402 transmits 700 a user IP packet destined for the Internet 410, which is received at the ingress classifier 408. The ingress classifier 408 classifies the user IP packet based on, e.g., the subscriber (source IP address) and application (destination IP address and port number). The Ingress classifier 408 inserts 702 a header, which may be a NSH into the user IP packet. The header includes a path label, as per regular procedures (see, e.g., the NSH standard). The header is used for determining the routing to a next hop in any of the service function forwarders 412a-412b. Then the ingress classifier 408 transmits 704 the user IP packet (and all user IP packets of the IP flow tagged with the same header) to the first service function forwarder 412a, which inspects the path label information included in the header and, according to the forwarding rules, transmits 706 the user IP packet and header to the first service function 414a.

The receiver 604 of the first service function 414a receives the user IP packet and header. The service implementer 614 applies a service associated with the user IP packet and the first service function 414a. After the service has been applied, the CTF 616 determines charging data for the applied service and adds 708 the charging data to the header to form a first updated user IP packet. The charging data identifies the service function 414a, the user that benefits from the service, the offered service characteristics, etc., for charging purposes, and does not depend on whether online or offline charging is going to be applied. The transmitter 602 of the first service function 414a then returns 710 the first updated user IP packet and header, which now includes charging data relating to the service applied by the first service function 414a, to the first service function forwarder 412a. Therefore, user IP packets leaving the first service function 414a include a header that contains both path label information (which was inserted by the ingress classifier 408) and charging information inserted by the first service function 414a.

The first service function forwarder 412a analyses the header and, based on the path label information, transmits 712 the first updated user IP packet to the second service function forwarder 412b, which analyses the header and, based on the path label information, transmits 714 the first updated user IP packet to the third service function 414c in the service function chain 401.

The receiver 604 of the third service function 414c receives the first updated user IP packet and header. The service implementer 614 of the third service function 414c applies the service associated with the user IP packet and the third service function. After the service has been applied, the CTF 616 of the third service function 414c determines charging data for the applied service and adds 716 the charging data to the header to form a second updated user IP packet. The header now includes collective charging data relating to services applied by the first and third service functions 414a, 414c. The transmitter 602 of the third service function 414c then returns 718 the second updated user IP packet and header to the second service function forwarder 412b.

Option A of FIG. 7 deals with an online charging scenario corresponding to route 406a. In such arrangements, the second service function forwarder 412b transmits 720a the second updated user IP packet to the relevant charging function, the OCF 428. At step 722a, the receiver 504 of the OCF 428 receives the second updated user IP packet; the charging data extractor 514 extracts the collective charging data in the header and strips, from the collective charging data in the header, the individual charging data provided by the first and third service functions; the charging data aggregator 516 aggregates the individual charging data into a single charging record; and a transmitter 502 of the OCF 428 transmits, towards the OCS, a request for authorisation based on the single charging record containing the aggregated charging data.

The receiver 504 of the OCF 428 receives a response to the transmitted request.

If the user has sufficient credit in an associated user account, the OCS deducts credit from the user account based on the single charging record and the received response comprises an authorisation for the services. The charging controller 518 of the OCF 428 determines that authorisation is given and the transmitter 502 transmits 724a the user IP packet and header, which now has the charging data removed, to the second service function forwarder 412b. As authorisation has been granted, the second service function forwarder 412b transmits 726 the user IP packet and header to the egress classifier 416, which removes 728 the header and then transmits 730 the packet on to the Internet or other final destination.

If the OCF 428 receives an indication from the OCS (i.e. the ABMF 432 or the RF 430) that the user does not have enough credit to pay for both services, the charging controller 518 of the OCF 428 determines that authorization is not given. The transmitter 502 of the OCF 428 does not transmit the user IP packet to the second service function forwarder 412b and instead generates backwards through the service function chain a TCP reset packet in order to tear down the TCP connection and release any resources in use by the user IP flow in previous intermediate nodes.

Option B of FIG. 7 relates to an offline charging scenario, an example of which is shown in route 406b illustrated in FIG. 4. Although the route 406b passes through a different set of service functions 414a, 414b, i.e. first and second service functions, to those shown in FIG. 7, the principles of operation remain the same.

The second service function forwarder 412b transmits 720b the second updated user IP packet to the relevant charging function, the CDF 420. At step 722*b*, the receiver 504 of the CDF 420 receives the second updated user IP packet; the charging data extractor 514 extracts the collective charging data in the header and strips, from the collective charging data in the header, the individual charging data provided by the first and second service functions; the charging data aggregator 516 aggregates the individual charging data into a single charging record; and the charging controller 518 controls the transmitter 502 of the CDF 420 to transmit, towards the offline charging system, the single charging record containing the aggregated charging data. The flow is similar to that of an online charging scenario, except that the last service function of the chain 401 is the CDF 420. The CDF 420, unlike the OCF 428, does not stop the user IP packet, but rather collects all the charging data inserted by the different service functions, aggregates the data into a single charging record and sends the single charging record containing the aggregated charging data to the CGF 432 as per regular procedures.

Like the OCF 428, the CDF 420 also removes the charging data from the header, so that when user IP packets are forwarded to the service function forwarder 2 from the CDF 420, the packets contain path label information in the header, but not charging information. The second service function forwarder 412*b* transmits 726 the user IP packet and header to the egress classifier 416, which removes 728 the header and then transmits 730 the packet on to the Internet or other final destination.

FIG. 7 follows the route 406*a* and, partially, route 406*b* shown in FIG. 4. However, it is noted that other routes through a service function chain are possible and the routes 406*a*, 406*b* of FIG. 4 are exemplary only.

FIG. 8 shows an exemplary service chaining architecture 800 implemented within a mobile telecommunications network. The arrows 806*a*-806*b* show the route of user IP packets through the service chaining architecture 800 in a downlink scenario from the Internet 810. It is noted that many of the features of the architecture 800 are the same or similar to those already described above in respect of FIG. 4 and so are not explained again in detail here, except where necessary. Such features may be given similar reference signs, except preceded by an "8".

As shown in FIG. 8, the service function forwarders 812*a*-812*b* may be configured to direct downlink user IP packets slightly differently than during uplink scenarios. Downlink user IP packets, once received by the egress classifier 816 are routed to the second service function forwarder 812*b* and from there to each of the service functions where the corresponding uplink flow was routed. Once all the service functions 814*a*-814*c* have been visited and had opportunity to add their charging information, the user IP packet is routed to either the CDF 820 or OCF 828 (as it corresponds), prior to be routed back to the UE 802*a*-802*b* that originated the corresponding uplink user IP packet.

FIG. 9 shows a signalling diagram for the control and implementation of charging in a mobile telecommunications network comprising the architectures described herein in a downlink scenario.

A downlink user IP packet is received 900 by the egress classifier 816, which adds 902 a header, e.g. a NSH, to the user IP packet. The header is determined by the egress classifier 816 and determines the path of the downlink user IP packet through the service function chain 801 shown in FIG. 8. The value of the header need not be the same as the value of the header of the uplink traffic flow on route 406*a*.

Then the egress classifier 816 transmits 904 the user IP packet to the second service function forwarder 812*b*, which is configured to forward user IP packets according to path data given in the header. Accordingly, the second service function forwarder 412*b* transmits 906 the user IP packet and header to the third service function 814*c*.

The receiver 602 of the third service function 814*c* receives the user IP packet and header. The service implementer 614 of the third service function 814*c* may apply a service in the downlink (e.g., a transparent caching service function, a video optimization or compression engine) associated with the user IP packet and the third service function 814*c*. If a service is applied, the CTF 616 of the third service function 814*c* determines charging data for the applied service and adds 908 the charging data to the header to form a first updated user IP packet. The charging data identifies the third service function 814*a*, the user that benefits from the service, the offered service characteristics, etc., for charging purposes, and does not depend on whether online or offline charging is going to be applied. The transmitter 602 of the third service function 484*a* then returns 910 the first updated user IP packet and header, which now includes charging data relating to the service applied by the third service function 814*a*, to the second service function forwarder 812*b*.

The second service function forwarder 812*b*, analyses the header and, based on the path label information, transmits 912 the first updated user IP packet to the first service function forwarder 812*a*, which analyses the header and, based on the path label information, transmits 914 the first updated user IP packet to the first service function 814*a* in the service function chain 401.

The service implementer 614 of the first service function 814*a* may also apply a service associated with the user IP packet and the first service function 814*a*. If so, the CTF 616 of the first service function 814*a* determines charging data for the applied service and adds 916 the charging data to the header to form a second updated user IP packet. The header now includes collective charging data relating to services applied by the third and first service functions 814*c*, 814*a*. The transmitter 602 of the first service function 814*a* then returns 918 the second updated user IP packet and header to the first service function forwarder 812*a*.

At this point, the user IP packet has been transmitted to all service functions 814*a*-814*c* required according to the routing information determined by the egress classifier 816. It is not necessary to transmit the second updated user IP packet including the collective charging data to one of the charging functions 820, 828. This may require the user IP packet to be transmitted back through one or more elements of the service function chain 801 dependent on the data communications therebetween. In the architecture 800 of FIG. 8, the user IP data packet must be transmitted back through the second service function forwarder 812*b*. Accordingly, the first service function forwarder 812*a*, analyses the header and, based on the path label information, transmits 920 the second updated user IP packet to the second service function forwarder 812*b*.

Option A of FIG. 9 deals with an online charging scenario corresponding to route 806*a*. The second service function forwarder 812*b* transmits 922*a* the second updated user IP packet to the relevant charging function, the OCF 828. At step 924*a*, the receiver 504 of the OCF 828 receives the second updated user IP packet; the charging data extractor 514 extracts the collective charging data in the header and strips, from the collective charging data in the header, the individual charging data provided by the first and third service functions; the charging data aggregator 516 aggregates the individual charging data into a single charging record; and a transmitter 502 of the OCF 428 transmits, towards the OCS, a request for authorisation based on the single charging record containing the aggregated charging data.

The receiver 504 of the OCF 828 receives a response to the transmitted request. If the user has sufficient credit in an associated user account, the OCS deducts credit from the user account based on the single charging record containing the aggregated charging data and the received response comprises an authorisation for the services. The charging controller 518 of the OCS 828 determines that authorisation is given and the transmitter 502 transmits 926a the user IP packet and header, which now has the collective charging data removed, to the second service function forwarder 812b. As authorisation has been granted, the second service function forwarder 812b transmits 928 the user IP packet and header to the first service function forwarder 812a, which in turn transmits 930 the user IP packet to the ingress classifier 808, which removes 932 the header and then transmits 934 the packet on to the UE 802a-802b or other final destination.

If the OCF 828 receives an indication from the OCS (i.e. the ABMF 832 or the RF 830) that the user does not have enough credit to pay for the applied services, the charging controller 518 of the OCS 828 determines that authorization is not given. The transmitter 502 of the OCF 828 does not transmit the user IP packet to the second service function forwarder 812b an onwards towards the UE 802a-802b. Instead generates backwards through the service function chain a TCP reset packet in order to tear down the TCP connection and release any resources in use by the user IP flow in previous intermediate nodes.

Option B of FIG. 9 relates to an offline charging scenario, an example of which is shown in route 806b. Although the route 806b passes through a different set of service functions 814a, 814b, i.e. first and second service functions, to those shown in FIG. 9, the principles of operation remain the same.

The second service function forwarder 812b transmits 922b the second updated user IP packet to the relevant charging function, the CDF 820. At step 924b, the receiver 504 of the CDF 820 receives the second updated user IP packet; the charging data extractor 514 extracts the collective charging data in the header and strips, from the collective charging data in the header, the individual charging data provided by the first and second service functions; the charging data aggregator 516 aggregates the individual charging data into a single charging record; and the charging controller 518 controls the transmitter 502 of the CDF 820 to transmit, towards the offline charging system, the single charging record containing the aggregated charging data. The flow is similar to that of an online charging scenario, except that the last service function of the chain 801 is the CDF 820. The CDF 820, unlike the OCF 828, does not stop the user IP packet, but rather collects all the charging data inserted by the different service functions, aggregates the data into a single charging record and sends the single charging record containing the aggregated charging data to the CGF 832 as per regular procedures.

The second service function forwarder 812b transmits 928 the user IP packet and header to the first service function forwarder 812a, which transmits 930 the user IP packet to the ingress classifier 808, which removes 932 the header and then transmits 934 the packet on to the UE 802a-802b or other final destination.

The methods and apparatus disclosed herein deal with uplink and downlink scenarios. FIG. 4 depicts the architecture 400 for uplink traffic flows. FIG. 8 depicts the architecture 800 for downlink traffic flows. The uplink and downlink traffic are distinguished at the point at which services are executed. Some services, such as firewall, parental control, header enrichment, are executed during the uplink flow.

Other services, such as transparent caching and video optimization, are executed during the downlink flow. The split of uplink and downlink traffic means that the downlink traffic need not necessarily traverse the same path in the same order as the uplink traffic.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A network node for implementing a charging function in a service function chain of a mobile telecommunications network, the service function chain comprising a plurality of service functions, each service function configured to apply at least one service associated with a user packet traversing the service function chain towards a destination, and configured to provide charging data related to the service function, the network node comprising:
   a receiver configured to receive, from a service function forwarder in the service function chain, a user packet including a header, wherein the header includes collective charging data provided by the plurality of service functions, the collective charging data comprising charging data for a plurality of services associated with the user packet; and
   a charging controller configured to control charging for the plurality of services associated with the user packet based on the collective charging data.

2. The network node according to claim 1, further comprising:
   a charging data extractor configured to extract, from the collective charging data in the header, a plurality of individual charging data provided by the plurality of service functions; and
   a charging data aggregator configured to aggregate the extracted plurality of individual charging data into a charging record for use by the charging controller to control the charging.

3. The network node according to claim 2, wherein the charging function is an Online Charging Function (OCF), and
   wherein the charging controller is further configured to control transmission of the user packet towards the destination based on the collective charging data.

4. The network node according to claim 3, further comprising a transmitter configured to transmit an authorisation request to at least one node of an online charging system (OCS) based on the charging record,
   wherein the receiver is configured to receive a response to the authorisation request, and
   wherein the charging controller is configured to permit transmission of the user packet towards the destination when the response indicates that a user is authorised to use the plurality of services.

5. The network node according to claim 2, wherein the charging function is a Charging Data Function (CDF) that further comprises a transmitter configured to transmit the charging record towards a billing domain.

6. The network node according to claim 1, wherein the header is a Network Service Header (NSH), the NSH comprising the collective charging data and a path indicator that indicates the plurality of service functions of the service function chain.

7. A network node for implementing a service function in a service function chain of a mobile telecommunications network, the service function chain comprising a plurality of service functions, each service function configured to apply at least one service associated with a user packet traversing the service function chain towards a destination, and configured to provide charging data related to the service function, the network node comprising:
   a receiver configured to receive a user packet, including a header, from a service function forwarder in the service function chain;
   a service implementer configured to apply a service associated with the user packet and the service function;
   a charging trigger function (CTF) configured to determine charging data for the applied service, the CTF being further configured to generate an updated user packet that includes an updated header comprising the charging data related to the applied service; and
   a transmitter configured to return the updated user packet to the service function forwarder.

8. The network node according to claim 7, wherein the received user packet is a previously updated user packet that includes a previously updated header comprising previous charging data added by at least one previous service function in the service function chain.

9. The network node according to claim 7, wherein the CTF is configured to determine same charging data for the applied service irrespective of whether a charging function is one of a Charging Data Function (CDF) and an Online Charging Function (OCF).

10. The network node according to claim 7, wherein the header is a Network Service Header (NSH), the NSH comprising a path indicator that indicates the plurality of service functions of the service function chain, and wherein the CTF is configured to add the determined charging data into the NSH.

11. A system for implementing a service function chain of a mobile telecommunications network, the system comprising:
   a plurality of service functions arranged sequentially, each service function comprising:
      a receiver configured to receive a user packet, including a header, from a service function forwarder in the service function chain;
      a service implementer configured to apply a service associated with the user packet and the service function;
      a charging trigger function (CTF) configured to determine charging data for the applied service, the CTF being further configured to generate an updated user packet that includes an updated header comprising the charging data related to the applied service; and a transmitter configured to return the updated user packet towards the service function forwarder in the service function chain; and a charging function comprising:
  a further receiver configured to receive, from the service function forwarder, the updated user packet including the updated header, wherein the updated header includes collective charging data comprising individual charging data determined by each of the plurality of service functions; and
  a charging controller configured to control charging for the applied services based on the collective charging data.

12. The system according to claim 11, wherein the header is a Network Service Header (NSH), the NSH comprising a path indicator that indicates the plurality of service functions of the service function chain, wherein the CTF is configured to add the determined charging data into the NSH, and wherein the NSH further comprises the collective charging data.

13. A method for implementing a service function chain of a mobile telecommunications network, the method comprising:
  at a plurality of service functions arranged sequentially:
    receiving, by a receiver from a service function forwarder in the service function chain, a user packet including a header;
    applying, by a service implementer, a service associated with the user packet and a service function;
    determining, by a charging trigger function (CTF), charging data for the applied service;
    generating, by the CTF, an updated user packet that includes an updated header comprising the charging data related to the applied service; and
    returning, by a transmitter, the updated user packet towards the service function forwarder in the service function chain,
  the method further comprising, at a charging function:
    receiving, by a further receiver from the service function forwarder, the updated user packet including the updated header, wherein the updated header includes collective charging data comprising individual charging data determined by each of the plurality of service functions; and
    controlling, by a charging controller, charging for the applied services based on the collective charging data.

14. The method according to claim 13, wherein the header is a Network Service Header (NSH), the NSH comprising a path indicator that indicates the plurality of service functions of the service function chain, wherein the CTF adds the determined charging data into the NSH, and wherein the NSH further comprises the collective charging data.

* * * * *